US009495262B2

(12) United States Patent
Miller et al.

(10) Patent No.: US 9,495,262 B2
(45) Date of Patent: Nov. 15, 2016

(54) MIGRATING HIGH ACTIVITY VOLUMES IN A MIRROR COPY RELATIONSHIP TO LOWER ACTIVITY VOLUME GROUPS

(71) Applicant: INTERNATIONAL BUSINESS MACHINES CORPORATION, Armonk, NY (US)

(72) Inventors: Dash D. Miller, Tucson, AZ (US); David C. Reed, Tucson, AZ (US); Max D. Smith, Tucson, AZ (US); Herbert Yee, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 237 days.

(21) Appl. No.: 14/146,653

(22) Filed: Jan. 2, 2014

(65) Prior Publication Data

US 2015/0186070 A1 Jul. 2, 2015

(51) Int. Cl.
*G06F 3/06* (2006.01)
*G06F 11/20* (2006.01)

(52) U.S. Cl.
CPC ....... *G06F 11/2074* (2013.01); *G06F 11/2069* (2013.01); *G06F 3/065* (2013.01); *G06F 11/2058* (2013.01)

(58) Field of Classification Search
CPC .......... G06F 3/067; G06F 2206/1012; G06F 3/061; G06F 3/0689; G06F 11/0709; G06F 11/2058; G06F 3/0647; G06F 9/5077; G06F 3/0619; G06F 3/0683; G06F 11/2074; G06F 11/2069; G06F 3/065; G06F 11/2048; G06F 11/1448
See application file for complete search history.

(56) References Cited

U.S. PATENT DOCUMENTS

| 6,185,601 | B1 * | 2/2001 | Wolff | G06F 17/30067 707/E17.005 |
| 7,120,769 | B2 * | 10/2006 | Yagawa | G06F 11/2058 707/999.202 |
| 2004/0250034 | A1 * | 12/2004 | Yagawa | G06F 11/2058 711/162 |
| 2004/0260875 | A1 * | 12/2004 | Murotani | G06F 3/0605 711/114 |
| 2005/0108304 | A1 * | 5/2005 | Wilson | G06F 3/0617 |

(Continued)

OTHER PUBLICATIONS

V. Sundaram, et al., "Efficient Data Migration in Self-Managing Storage Systems", Proceedings of the 2006 IEEE International Conference on Autonomic Computing, pp. 297-300, IEEE Computer Society Washington, DC, USA, ISBN:1-4244-0175-5 (2006).
"DFSMS Advanced Copy Services", IBM Corporation, Document No. SC35-0428-19, 1994, pp. 814.

*Primary Examiner* — Hashem Farrokh
(74) *Attorney, Agent, or Firm* — David W. Victor; Konrad Raynes Davda & Victor LLP

(57) ABSTRACT

Provided are a computer program product, system, and method for migrating high activity volumes in a mirror copy relationship to lower activity volume groups. A determination is made of usage rates of multiple volume groups, wherein each volume group is comprised of source volumes at a primary site whose data is copied to volumes at a secondary site. A first selected volume group and a second selected volume group are selected based on the determined usage rates of the volume groups. A first volume in the first selected volume group is migrated to a second volume in the second selected volume group. Updates to the first volume, received while migrating the first volume to the second volume, are copied to a mirror first volume mirroring the first volume at the secondary site.

23 Claims, 5 Drawing Sheets

(56) References Cited

U.S. PATENT DOCUMENTS

| | | |
|---|---|---|
| 2009/0300283 A1 | 12/2009 | Kudo |
| 2012/0203999 A1 | 8/2012 | Jess |
| 2013/0332692 A1* | 12/2013 | Satoyama ............. G06F 3/0605 711/170 |
| 2014/0208023 A1* | 7/2014 | Orikasa ................. G06F 3/0665 711/114 |

* cited by examiner

Logical Subsystem (LSS) Information

Volume Information

Session Information

Copy Information

MIGRATING HIGH ACTIVITY VOLUMES IN A MIRROR COPY RELATIONSHIP TO LOWER ACTIVITY VOLUME GROUPS

BACKGROUND OF THE INVENTION

1. Field of the Invention

The present invention relates to a computer program product, system, and method for migrating high activity volumes in a mirror copy relationship to lower activity volume groups.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy. In data mirroring systems, data is maintained in volume pairs. A volume pair is comprised of a volume in a primary storage device and a corresponding volume in a secondary storage device that includes an identical copy of the data maintained in the primary volume. Primary and secondary control units, also known as storage controllers or enterprise storage servers, may be used to control access to the primary and secondary storage devices. In peer-to-peer remote copy operations (PPRC), multiple primary control units may have source/target pairs, i.e., volume pairs, included in consistency groups so that data copied to target volumes by the different primary control units maintains data consistency.

When establishing a mirror copy relationship, the administrator may set up copy relationship between volumes in a session that may be grouped according to Logical Subsystem (LSS), where there may be multiple LSSs, each grouping multiple volumes, and where the LSSs are assigned to one session. Data consistency may be maintained among the mirror copy operations between the volumes in the LSSs assigned to a session.

In current mirror copy arrangements where multiple volumes in volume groups are being mirrored to a remote storage site location, certain volumes or LSSs may experience relatively high levels of I/O activity and updates which can cause delays that lead to suspensions and performance degradation. If the administrator notices that the workload is not properly balanced among the LSSs, then the administrator may move volumes among sessions and LSSs to balance the workload.

SUMMARY

Provided are a computer program product, system, and method for migrating high activity volumes in a mirror copy relationship to lower activity volume groups. A determination is made of usage rates of multiple volume groups, wherein each volume group is comprised of source volumes at a primary site whose data is copied to volumes at a secondary site. A first selected volume group and a second selected volume group are selected based on the determined usage rates of the volume groups. A first volume in the first selected volume group is migrated to a second volume in the second selected volume group. Updates to the first volume, received while migrating the first volume to the second volume, are copied to a mirror first volume mirroring the first volume at the secondary site.

DETAILED DESCRIPTION

Described embodiments provide techniques to balance the workload on primary volumes at a primary site being mirrored to secondary volumes at a secondary site by automatically migrating high Input/Output (I/O) activity volumes in high I/O activity volume groups, such as LSSs, to lower I/O activity volume groups. To further balance the workload, described embodiments may automatically migrate a low I/O activity volume from a low I/O activity volume group to the high I/O activity volume group (e.g., LSS) from which the high I/O activity volume was migrated to the low I/O activity volume group. In this way, described embodiments provide techniques for swapping volumes across volume groups and perhaps sessions to move higher I/O activity volumes to lower activity volume groups and vice versa to balance the workload and avoid performance problems and degradations associated with an uneven distribution of the I/O workload across volumes being mirrored.

Figure 1:
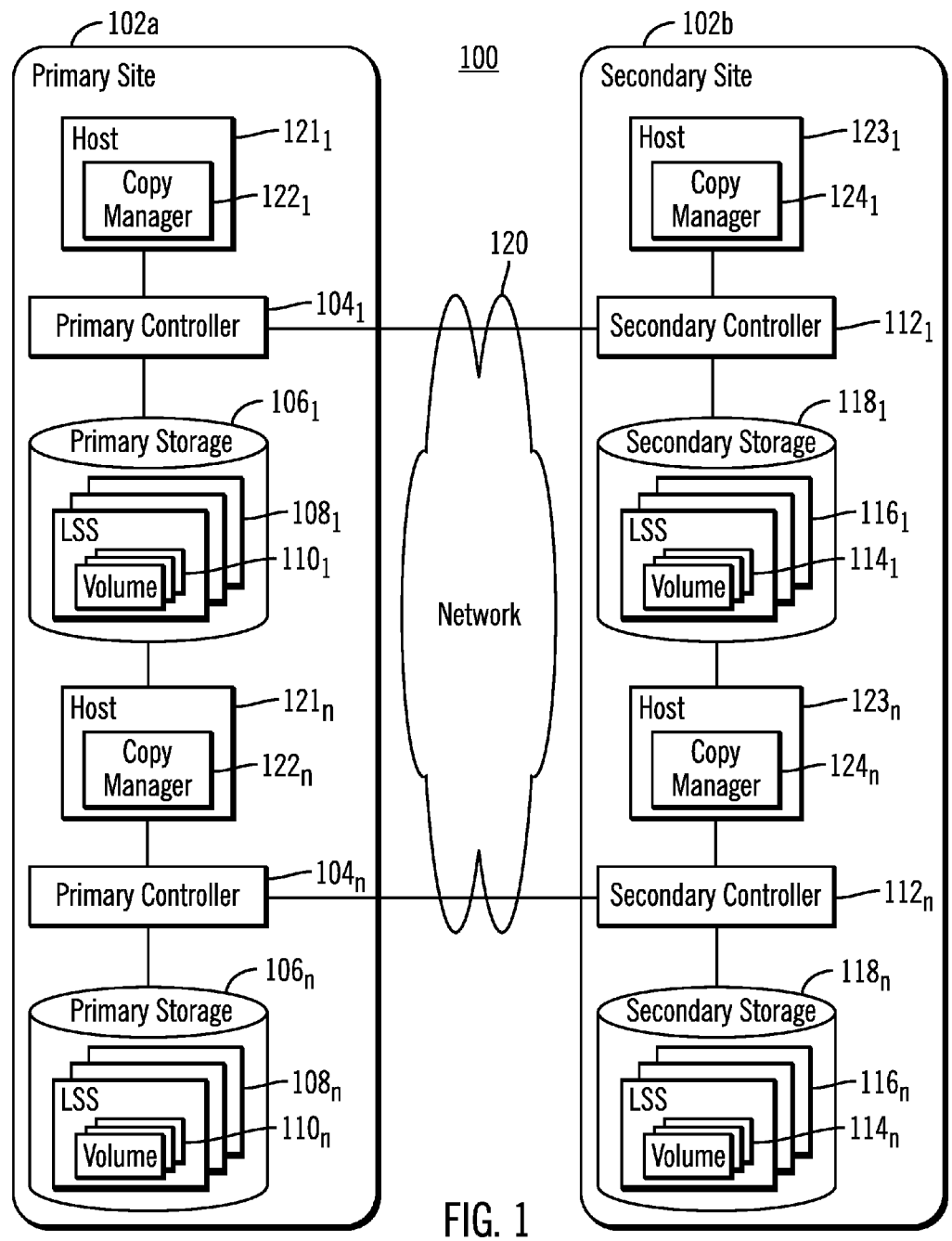
FIG. 1 illustrates an embodiment of a storage replication environment.

FIG. 1 illustrates an embodiment of a data replication environment 100 having a primary site 102a and a secondary site 102b, where the secondary site 102b provides a remote site backup of volumes and data at the primary site 102a. One or more primary controllers $104_1 \ldots 104_n$ at the primary site 102a manage primary storages $106_1 \ldots 106_n$ each having one or more logical subsystems (LSSs) $108_1 \ldots 108_n$, each LSS providing a grouping of one or more volumes $110_1 \ldots 110_n$. The primary controllers $104_1 \ldots 104_n$ mirror the volumes $110_1 \ldots 110_n$ in their LSSs $108_1 \ldots 108_n$ to the secondary controllers $112_1 \ldots 112_n$ at the secondary site 102a over a network 120 to store in secondary volumes $114_1 \ldots 114_n$ in LSSs $116_1 \ldots 116_n$ at secondary storages $118_1 \ldots 118_n$ at the secondary site 102b. In this way, there is a mirror relationship between primary site 102a volumes $110_1 \ldots 110_n$ and secondary site 102b volumes $114_1 \ldots 114_n$.

At the primary site 102a, a host $121_1 \ldots 121_n$ may be coupled to each of the primary controllers $104_1 \ldots 104_n$, and each host $121_1 \ldots 121_n$ includes a copy manager $122_1 \ldots 122_n$ to manage the mirroring of the primary volumes $110_1 \ldots 110_n$ to their paired secondary volumes $114_1 \ldots 114_n$. At the secondary site 102b, a host $123_1 \ldots 123_n$ may be coupled to each of the secondary controllers $112_1 \ldots 112_n$ and each host $123_1 \ldots 123_n$ includes a copy manager $124_1 \ldots 124_n$ to manage the data mirroring operations at the secondary site 102b. In an alternative embodiments, the copy managers $122_1 \ldots 122_n$ and $124_1 \ldots 124_n$ may also be implemented within the primary $104_1 \ldots 104n$ and secondary $112_1 \ldots 112n$ controllers, controllers. Further, a portion of the operations described as performed with respect to the copy managers $122_1 \ldots 122_n$ and $124_1 \ldots 124_n$ may be implemented at both the host $121_1 \ldots 121_n$ and primary controllers $104_1 \ldots 104_n$.

The primary copy managers $122_1 \ldots 122_n$ may manage the mirroring of volumes $110_1 \ldots 110_n$ by assigning LSSs $108_1 \ldots 108_n$ to sessions, such that consistency of data is maintained within the mirroring of the volumes $110_1 \ldots 110_n$ in LSSs $108_1 \ldots 108_n$ assigned to sessions. Although the grouping of volumes is described with respect to LSSs, other volume group types may be used in addition to LSSs.

The variable "n" as used herein indicates a variable number of an element to which it is associated, e.g., $104_n$, $106_n$, etc., and may denote a different number of an element when used with different elements in the same or different embodiments.

The storages $106_1 \ldots 106_n$ and $118_1 \ldots 118_n$ may store tracks in a Redundant Array of Independent Disks (RAID) configuration. The storages $106_1 \ldots 106_n$ and $118_1 \ldots 118_n$ may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The network 120 may comprise one or more networks, such as one or more interconnected Local Area Networks (LAN), Storage Area Networks (SAN), Wide Area Network (WAN), peer-to-peer network, wireless network, etc.

The controller $104_1 \ldots 104_n$ may receive I/O requests directed to the volumes $110_1 \ldots 110_n$ from hosts (not shown). Any updates to data form the hosts are mirrored to the secondary site 102b.

The copy managers $122_1 \ldots 122_n$, $124_1 \ldots 124_n$ may comprise one or more programs loaded into a memory that are executed by the hosts $121_1 \ldots 121_n$, $123_1 \ldots 123_n$ or may be implemented in hardware devices in the controllers $104_1 \ldots 104_n$, $112_1 \ldots 112_n$, such as in Application Specific Integrated Circuits (ASIC).

Figure 2:
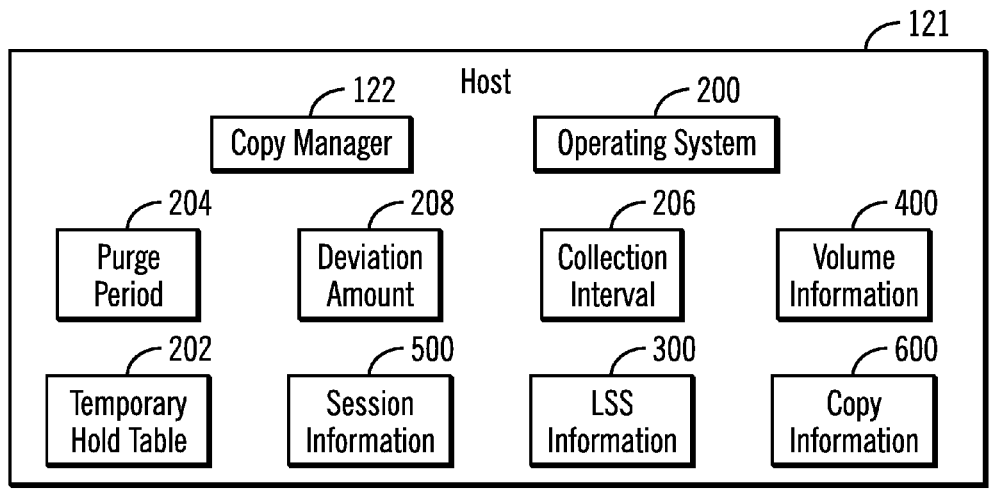
FIG. 2 illustrates an embodiment of a primary controller.
Figure 3:
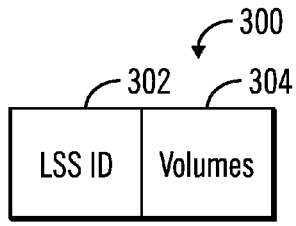
FIG. 3 illustrates an embodiment of Logical Subsystem (LSS) information.
Figure 4:
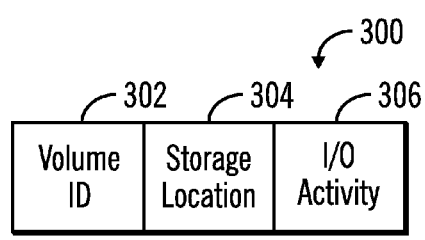
FIG. 4 illustrates an embodiment of volume information.

FIG. 2 illustrates an embodiment of program and data elements maintained by a host 121, such as hosts primary controllers $121_1 \ldots 121_n$, including a copy manager 122, e.g., $122_1 \ldots 122_n$, to manage the mirroring and migration operations and an operating system 200 to manage Input/Output (I/O) requests to the storage volumes $110_1 \ldots 110_n$ in the attached storages $106_1 \ldots 106_n$. The hosts $123_1 \ldots 123_n$ may include the operating system 200. The operating system 200 maintains logical subsystem (LSS) information 300 (FIG. 3) for each of the LSSs $108_1 \ldots 108_n$, $114_1 \ldots 114_n$, including an LSS ID 302 and volume information 302 indicating the volumes included in the LSS 302 and volume information 400 (FIG. 4), including a volume identifier (ID) 402; storage location 404 indicating a location of the volume in the storages $106_1 \ldots 106_n$ and $118_1 \ldots 118_n$; and I/O activity 406 for the volume indicating write and/or read I/O activity for the volume 402.

The copy manager 122 may use a mirroring or remote copy operation facility such as Extended Remote Copy (XRC) to mirror primary volumes $110_1 \ldots 110_n$ to secondary volume $114_1 \ldots 114_n$, and may use another facility or program to migrate a primary volume $110_1 \ldots 110_n$ to another primary volume $110_1 \ldots 110_n$ at the primary site 2a, such as a point-in-time (PiT) copy program, e.g., snapshot, the International Business Machines ("IBM®") Flash-Copy® or a migration program, such as a Transparent Data Migration Facility (TDMF).

The copy managers $122_1 \ldots 122_n$, $124_1 \ldots 124_n$ may be a component of the operating system 200, which may comprise an operating system known in the art, such as the International Business Machines ("IBM®") Z/OS® operating system. (IBM and Z/OS are trademarks of IBM in the United States and foreign countries). In z/OS embodiments, the copy manager $122_1 \ldots 122_n$ may determine the volume I/O activity 406 from System Management Facility (SMF) records. Alternatively, the copy managers $122_1 \ldots 122_n$, $124_1 \ldots 124_n$ may comprise a separate storage facility of the operating system, such as the IBM Data Facility Storage Management Subsystem (DFSMS). DFSMS provides an operating environment to automate and centralize the management of storage, data management program, management device management. In further embodiments, the operating system 200 may determine the I/O activity 406 from other gathered metrics and facilities in the system.

Figure 5:
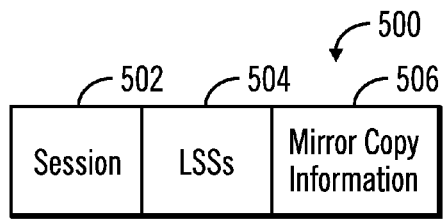
FIG. 5 illustrates an embodiment of session information.
Figure 6:
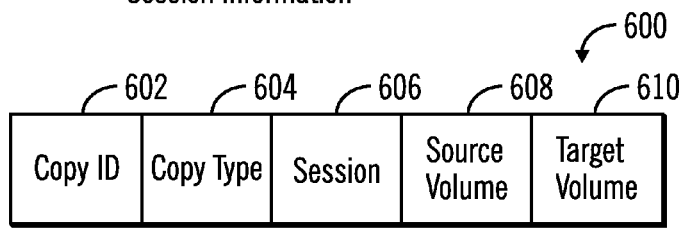
FIG. 6 illustrates an embodiment of copy information.

The primary controller copy managers $122_1 \ldots 122_n$ maintain session information 500 (FIG. 5) that identifies a session 502, LSSs 504 assigned to the session; and mirror copy information 506 indicating the volumes in the assigned LSSs 504 which are involved in a mirror copy relationship with volumes $114_1 \ldots 114_n$ at the secondary site 2b. Each primary controller $104_1 \ldots 104_n$ may manage multiple sessions 500 including the LSSs 504 maintained by that primary controller 104.

The copy manager 122 maintains copy information 600 for each copy relationship between primary volumes $110_1 \ldots 110_n$ being mirrored or migrated, including a copy ID 602 identifying the established copy operation; a copy type 604, e.g., mirroring, migration, point-in-time, etc.; the session 606 in which the copy is included; and a source volume 608 and a target volume 610 involved in the specified copy relationship, where the source volume 608 is copied, mirrored, migrated or point-in-time copied to the target volume 610. The copy manager 122 uses the copy information 600 to manage the copying of the data from the source 608 to the target 610 volumes. Further, the source 608 and target 610 volumes may be at different sites 102a, 102b or at the same site 102a.

The copy manager 122 further maintains a temporary hold table 202 indicating target primary volumes $110_1 \ldots 110_n$ to which source primary volumes $110_1 \ldots 110_n$ were migrated on the primary site 102a that are to be unavailable for further migration for a purge period 204. The copy manager 122 further maintains user configurable variables such as a collection interval 206 indicating an interval at which the copy manager 122 gathers information on I/O activity at the volumes $110_1 \ldots 110_n$ to use to determine whether to swap a high I/O activity volume $110_1 \ldots 110_n$ in a high I/O activity LSS $108_1 \ldots 108_n$ with a low I/O activity volume $110_1 \ldots 110_n$ in a low I/O activity LSS $108_1 \ldots 108_n$, and a deviation amount 208 indicating a difference between the high I/O activity and low I/O activity LSSs $108_1 \ldots 108_n$ at the primary controller 102 that triggers the migration swap of the hot I/O activity primary volume with the cold I/O activity secondary volume.

Figure 7A:
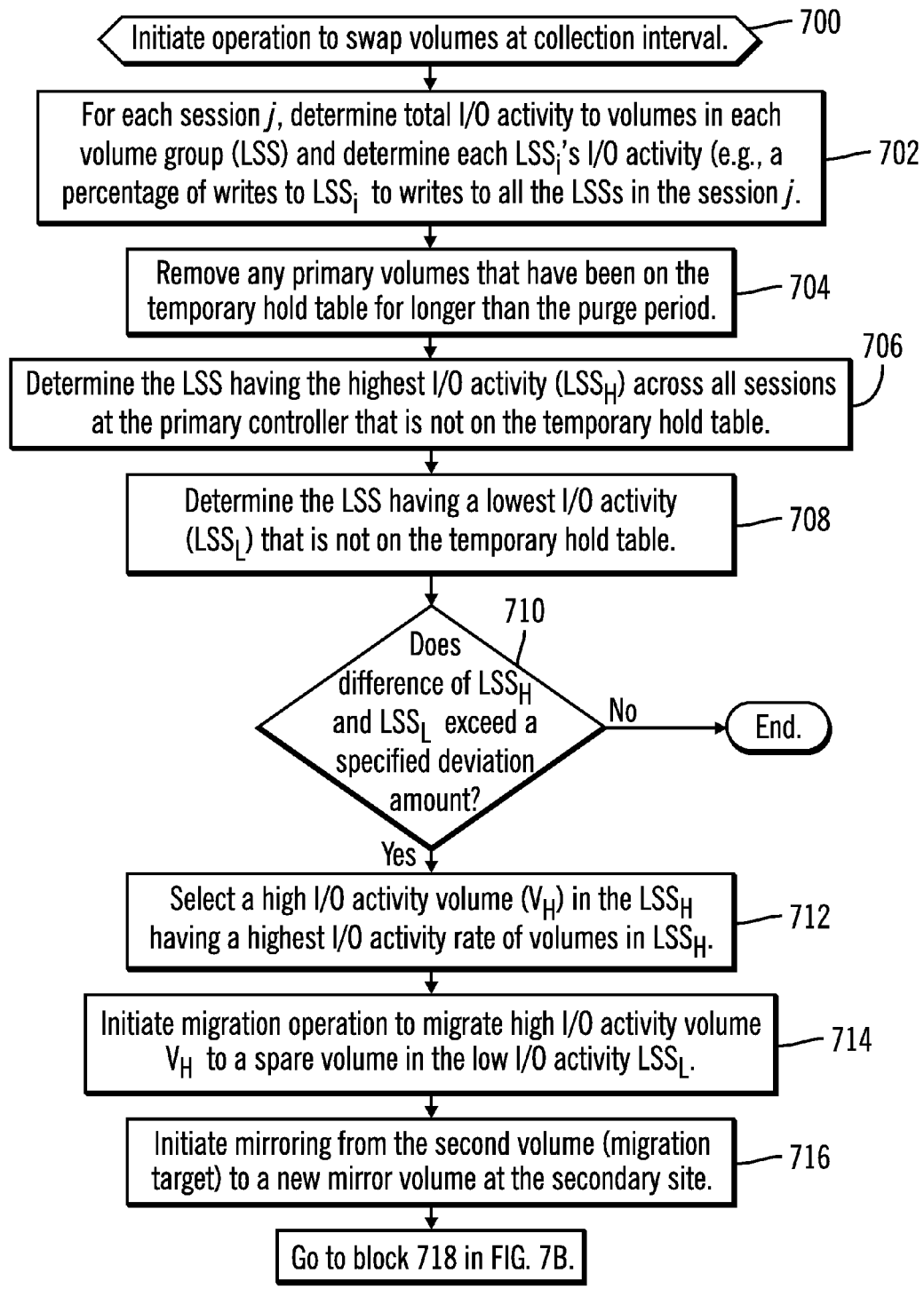
FIGS. 7a and 7b illustrate an embodiment of operations to migrate volumes between volume groups based on I/O activity.
Figure 7B:
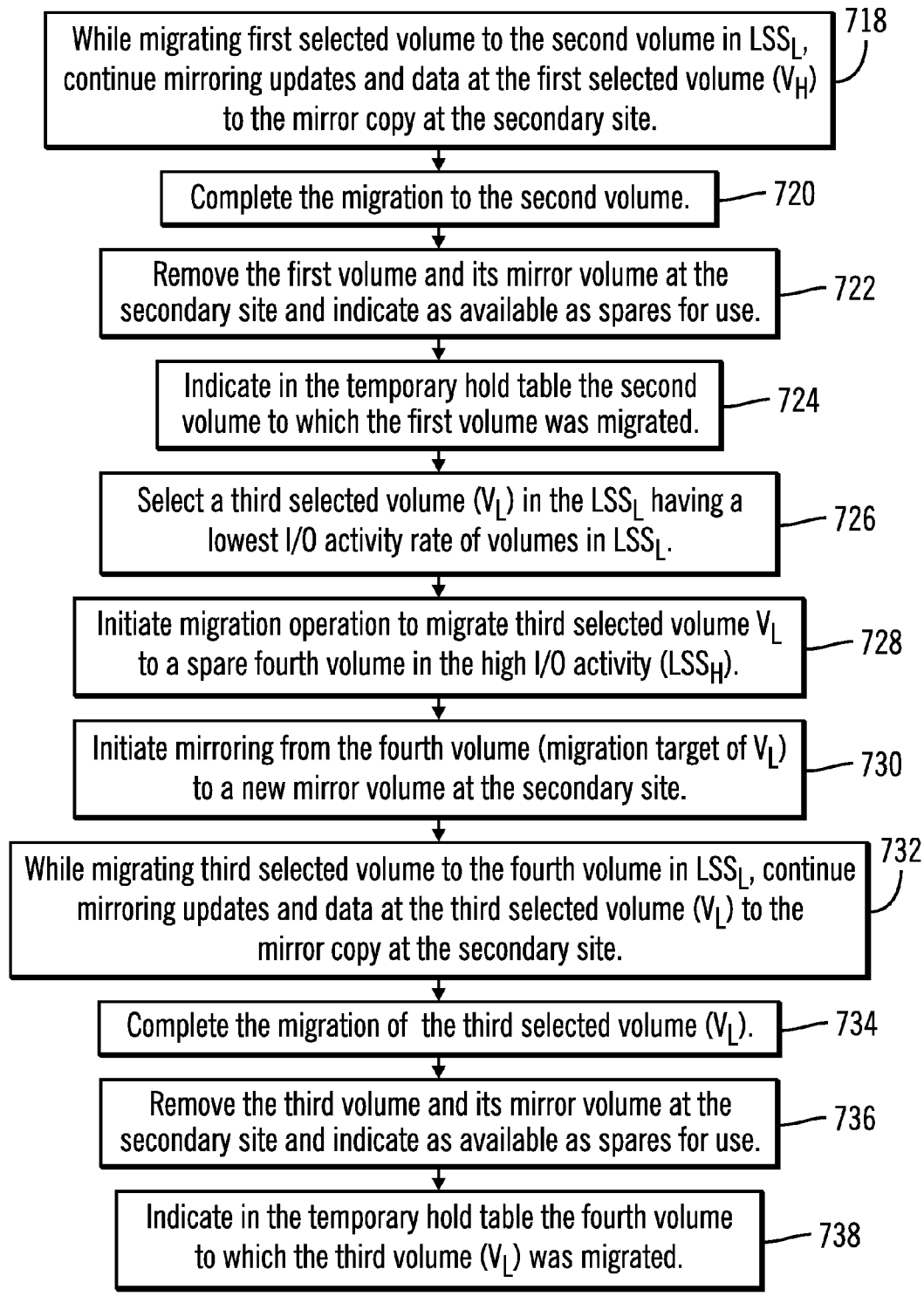

FIGS. 7a and 7b illustrate an embodiment of operations performed by the copy managers $122_1 \ldots 122_n$ to initiate operations to swap high and low activity volumes $110_1 \ldots 110_n$ at the primary site 2a at a collection interval 206. Upon initiating (at block 700) the swap operation, the copy manager 122 (e.g., $122_1 \ldots 122_n$) for each session j at the primary controller 104, determines (at block 702) total I/O activity to volumes in each volume group (LSS) managed by the primary controller 104 and each $LSS_i$'s I/O activity. The I/O activity for an $LSS_i$ in a session may be calculated as a percentage of writes (or reads or reads and writes) to the $LSS_i$ to the writes to all LSSs in the session j. The copy manager 122 removes (at block 704) any primary volumes that have been indicated on the temporary hold table 202 for longer than the purge period 204.

The copy manager 122 determines (at block 706) the LSS having the highest I/O activity ($LSS_H$) across all sessions at the primary controller 104 that is not on the temporary hold table 202, also referred to as first selected volume group. The LSS is determined (at block 708) having a lowest I/O activity ($LSS_L$) across all sessions at the primary controller 104 that is also not on the temporary hold table 202, also referred to as the second selected volume group. The copy manager 122 determines (at block 710) whether the difference of the high activity LSS ($LSS_H$) and the low activity LSS ($LSS_L$) exceed the specified deviation amount 208. If (from the no branch of 710) the high and low I/O activity volumes do not differ by the deviation 208 amount, then control ends. Otherwise, if they differ by the deviation 208, then the copy manager 122 selects (at block 712) a high I/O activity volume ($V_H$), also referred to as a first volume, in the $LSS_H$ having a highest I/O activity rate. Migration is initiated (at block 714) to migrate the high I/O activity volume $V_H$ to a spare volume, also referred to as a second volume, in the low I/O activity $LSS_L$. In this way, the high activity volume ($V_H$) is moved to an LSS that has lower activity, such as a lowest activity. The high I/O activity volume ($V_H$) may be subject to a mirror copy relationship to a mirror volume at the secondary site 102b, also referred to as a mirror first volume.

When establishing the migration copy operation for the second volume, the copy manager 122 may initiate (at block 716) mirroring from the second volume (migration target of the high I/O activity volume) to a mirror volume at the secondary site, also referred to as a mirror second volume. In this way, while the primary volume is being migrated to a new primary volume in the $LSS_L$ at the primary site, the new primary volume in the low I/O activity $LSS_L$ is mirrored to a remote volume $114_1 \ldots 114n$ on the secondary site 2b to maintain continuous redundancy of the volume that is migrated.

With respect to FIG. 7b, while migrating the high I/O activity volume ($V_H$) to the second spare volume in the low activity LSS ($LSS_L$), the copy manager 122 continues (at block 718) to mirror updates and data at the first selected high I/O activity volume (VH) to the mirror copy at the secondary site. Upon completing (at block 720) the migration from the high I/O activity volume ($V_H$), the migrated first volume at the primary site 102a and its mirror copy at the secondary site 102b are indicated as removed (at block 722) and available for use as a spare for further migration operation. The volume in the low activity LSS ($LSS_L$) to which the high I/O activity volume was migrated is then indicated (at block 724) in the temporary hold table 202 so it is not again migrated within the purge period 204.

The copy manager 122 then performs the swap from the low I/O activity volume group ($LSS_L$) with the high activity $LSS_{(H)}$ by selecting (at block 726) a volume ($V_L$) in the low I/O activity $LSS_L$ having a lowest I/O activity rate of volumes in $LSS_L$, also referred to as a third volume. A migration operation is initiated (at block 728) to migrate the selected low I/O activity volume ($V_L$) to a spare fourth volume in the high I/O activity ($LSS_H$), also referred to as a fourth volume. While migrating the low I/O activity third volume ($V_L$), the copy manager 122 initiates (at block 730) mirroring from the fourth volume (migration target of $V_L$) to a new mirror volume at the secondary site 102b, referred to as the mirror fourth volume. Further, while migrating the selected low I/O activity volume ($V_L$) to the fourth volume in the high I/O activity $LSS_H$, the copy manager 122 continues mirroring (at block 732) updates and data at the third volume ($V_L$) being migrated to a corresponding mirror copy of the volume ($V_L$) at the secondary site 102b, also referred to as a mirror third volume. Upon completing (at block 734) the migration of the low I/O activity volume ($V_L$) to the high I/O activity volume group ($LSS_H$), the copy manager 122 removes (at block 736) the low I/O activity volume ($V_L$) that is the source of the migrations and its mirror volume at the secondary site 102a, and indicates these removed volumes as available as use as spares. The fourth volume to which the third low I/O activity ($V_L$) was migrated is indicated (at block 738) in the temporary hold table 202 so it will not be subject to a further swapping operation within the purge period 204.

The described embodiments are described with respect to selecting volumes in the primary site to swap based on I/O activity to select a highest I/O activity volume in a highest volume group to swap with a lowest I/O activity volume in a lowest volume group. In alternative embodiments, criteria other than I/O activity may be used to select the volume groups (e.g., LSSs) and the volumes within the selected volume groups to swap or move to new locations in different volume group. For instance, factors other than I/O activity, such as attributes of the data and the storage devices to which data is being migrated may be considered to select volume groups and volumes within volume groups to migrate.

With the described embodiments, primary volumes at a primary site involved in a mirror copy relationship with secondary volumes at a secondary site may be analyzed for their I/O activity. If the volume groups, e.g., LSSs, to which the volumes are assigned have a relatively high I/O activity level, then with described embodiments, a high I/O activity volume in a high I/O activity volume group (LSS) may be swapped with a low I/O activity volume in a lowest I/O activity volume group (LSS). In this way, volumes are moved among the LSSs to balance the I/O workload occurring in the volume groups. Further, with described embodiments, the migration of volumes to balance the workload may occur while the source and target of the migration at the primary site is being mirrored to a remote site so that the remote mirror copy recovery data continues even during the migration. Further, during the migration, an additional mirror relationship may be formed between the target volume of the primary volume being migrated to a remote volume at the secondary site so that the new volume to which the high and low I/O activity volumes are being migrated are subject to mirror copying to provide a recovery remote copy of the new volume.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
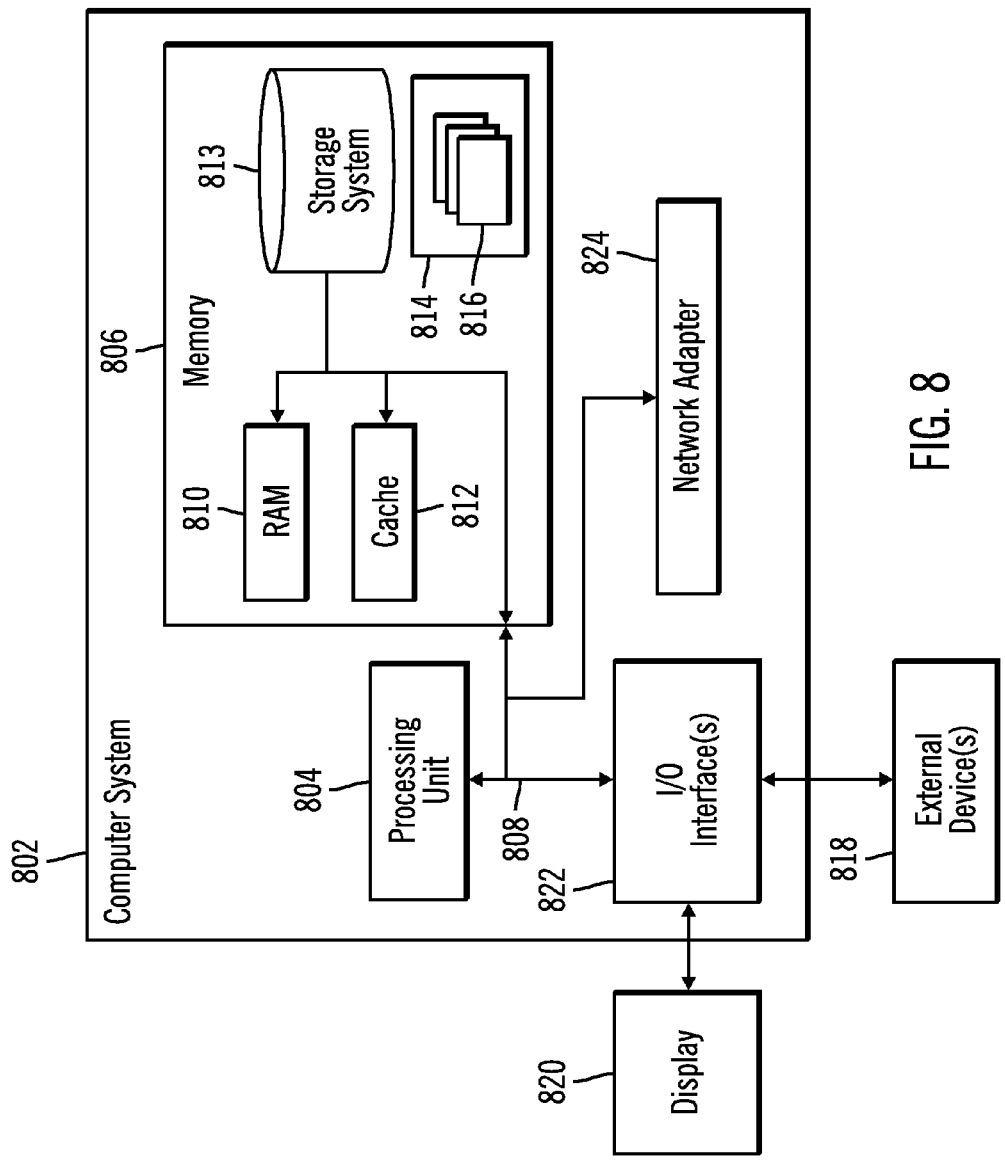
FIG. 8 illustrates an embodiment of a computing environment in which embodiments may be implemented.

FIG. 8 illustrates an embodiment of a computer system 802 which may comprise an implementation of the hosts $121_1 \ldots 121_n$, $123_1 \ldots 123_n$, and primary $104_1 \ldots 104_n$ and secondary $112_1 \ldots 112_n$ controllers. Alternatively, the hosts $121_1 \ldots 121_n$, $123_1 \ldots 123_n$ and the controllers $104_1 \ldots 104_n$ and $112_1 \ldots 112_n$ may be implemented as a combination of hardware and/or software. The hosts $121_1 \ldots 121_n$, $123_1 \ldots 123_n$ and the controllers $104_1 \ldots 104_n$ and $112_1 \ldots 112_n$ may be implemented in a cloud computing environment in which they provide storage services to connected hosts. Computer node 802 is only one example of a suitable computing node and is not intended to suggest any limitation as to the scope of use or functionality of embodiments of the invention described herein. Regardless, computer node 802 is capable of being implemented and/or performing any of the functionality set forth hereinabove.

The computer node 802 is operational with numerous other general purpose or special purpose computing system environments or configurations. Examples of well-known computing systems, environments, and/or configurations that may be suitable for use with computer node 802 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 802 may be described in the general context of computer system executable instructions, such as program modules, being executed by a computer system. Generally, program modules may include routines, programs, objects, components, logic, data structures, and so on that perform particular tasks or implement particular abstract data types. Computer node 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 802 is shown in the form of a general-purpose computing device. The components of computer system/server 802 may include, but are not limited to, one or more processors or processing units 804, a system memory 806, and a bus 808 that couples various system components including system memory 806 to processor 804.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 802 typically includes a variety of computer system readable media. Such media may be any available media that is accessible by computer node 802, and it includes both volatile and non-volatile media, removable and non-removable media, and may be used for storing the programs and data used by the programs.

System memory 806 can include computer system readable media in the form of volatile memory, such as random access memory (RAM) 810 and/or cache memory 812. Computer node 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules etc., and program data. Each of the operating system, one or more application programs, other program modules, and program data or some combination thereof, may include an implementation of a networking environment. Program modules 816 generally carry out the functions and/or methodologies of embodiments of the invention as described herein, such as the operations of the logging program 8.

Computer node 802 may also communicate with one or more external devices 818 such as a keyboard, a pointing device, a display 820, etc.; one or more devices that enable a user to interact with the computer node 802; and/or any devices (e.g., network card, modem, etc.) that enable computer system/server 802 to communicate with one or more other computing devices. Such communication can occur via Input/Output (I/O) interfaces 822. Still yet, computer node 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing copying of data between groups of source and target volumes, the computer program product comprising a non-transitory computer readable storage medium having computer readable program code embodied therein that when executed performs operations, the operations comprising:
   determining usage rates of multiple volume groups, wherein each volume group is comprised of source volumes at a primary site whose data is copied to target volumes at a secondary site;
   selecting a first selected volume group and a second selected volume group based on the determined usage rates of the volume groups;
   migrating a first volume in the first selected volume group to a second volume in the second selected volume group; and
   copying updates to the first volume, received while migrating the first volume to the second volume, to a mirror first volume mirroring the first volume at the secondary site.

2. The computer program product of claim 1, wherein the operations further comprise:
   copying data at the second volume to a mirror second volume at the secondary site while the first volume is being migrated to the second volume, wherein the mirror second volume provides a mirror copy of the second volume.

3. The computer program product of claim 1, wherein the operations further comprise:
   indicating the first volume as a spare volume in response to completing the migration of the first volume to the second volume.

4. The computer program product of claim 1, wherein the operations further comprise:
   migrating a third volume in the second selected volume group to a fourth volume in the first selected volume group;
   copying updates to the third volume, received while migrating the third volume to the fourth volume, to a mirror second volume at the secondary site; and
   copying data at the fourth volume to a mirror third volume at the secondary site while the third volume is being migrated to the fourth volume.

5. The computer program product of claim 1, wherein the usage rates indicate Input/Output (I/O) activity to each of the volumes in the volume groups, wherein the selected first volume group has a highest I/O activity of the volume groups and wherein the selected second volume group has a lowest I/O activity of the volume groups.

6. The computer program product of claim 5, wherein the operations further comprise:
   determining whether a difference of the I/O activity for the volume groups having the highest I/O activity and the lowest I/O activity exceeds a specified deviation amount, wherein the operations of selecting the first and the second selected volume groups, migrating the first volume, and copying the updates to the first volume are performed in response to determining that the difference of the I/O activity for the volume groups exceeds the specified deviation amount.

7. The computer program product of claim 5, wherein the volume groups comprise logical subsystems (LSSs) allocated to sessions, wherein the I/O activity of each volume group comprise a relative I/O activity of the volume group in the session in which the volume group is included, and wherein the highest I/O activity and the lowest I/O activity are determined for LSSs across the sessions.

8. The computer program product of claim 7, wherein the I/O activity of each LSS in each session comprises a percentage of writes for the LSS of writes for all LSSs in the session.

9. The computer program product of claim 5, wherein the first volume has a highest I/O activity of volumes in the first selected volume group.

10. The computer program product of claim 9, wherein the operations further comprise:
    migrating a third volume in the second selected volume group to a fourth volume in the first selected volume group, wherein the third volume has a lowest I/O activity of volumes in the second selected volume group.

11. The computer program product of claim 10, wherein the operations further comprise:
    indicating the second and fourth volumes as ineligible for migration operations for a predetermined period; and
    indicating the second and fourth volumes as eligible for migration based on their I/O activity in response to expiration of the predetermined period.

12. A system for managing copying of data between groups of source and target volumes, comprising:
    a processor; and
    a computer readable storage medium having computer readable program code embodied therein that when executed by the processor perform operations, the operations comprising:
       determining usage rates of multiple volume groups, wherein each volume group is comprised of source volumes at a primary site whose data is copied to target volumes at a secondary site;
       selecting a first selected volume group and a second selected volume group based on the determined usage rates of the volume groups;
       migrating a first volume in the first selected volume group to a second volume in the second selected volume group; and
       copying updates to the first volume, received while migrating the first volume to the second volume, to a mirror first volume mirroring the first volume at the secondary site.

13. The system of claim 12, wherein the operations further comprise:
    copying data at the second volume to a mirror second volume at the secondary site while the first volume is being migrated to the second volume, wherein the mirror second volume provides a mirror copy of the second volume.

14. The system of claim 12, wherein the operations further comprise:
migrating a third volume in the second selected volume group to a fourth volume in the first selected volume group;
copying updates to the third volume, received while migrating the third volume to the fourth volume, to a mirror second volume at the secondary site; and
copying data at the fourth volume to a mirror third volume at the secondary site while the third volume is being migrated to the fourth volume.

15. The system of claim 12, wherein the usage rates indicate Input/Output (I/O) activity to each of the volumes in the volume groups, wherein the selected first volume group has a highest I/O activity of the volume groups and wherein the selected second volume group has a lowest I/O activity of the volume groups.

16. The system of claim 15, wherein the operations further comprise:
determining whether a difference of the I/O activity for the volume groups having the highest I/O activity and the lowest I/O activity exceeds a specified deviation amount, wherein the operations of selecting the first and the second selected volume groups, migrating the first volume, and copying the updates to the first volume are performed in response to determining that the difference of the I/O activity for the volume groups exceeds the specified deviation amount.

17. The system of claim 16, wherein the first volume has a highest I/O activity of volumes in the first selected volume group.

18. A method for managing copying of data between groups of source and target volumes, comprising:
determining usage rates of multiple volume groups, wherein each volume group is comprised of source volumes at a primary site whose data is copied to target volumes at a secondary site;
selecting a first selected volume group and a second selected volume group based on the determined usage rates of the volume groups;
migrating a first volume in the first selected volume group to a second volume in the second selected volume group; and
copying updates to the first volume, received while migrating the first volume to the second volume, to a mirror first volume mirroring the first volume at the secondary site.

19. The method of claim 18, further comprising:
copying data at the second volume to a mirror second volume at the secondary site while the first volume is being migrated to the second volume, wherein the mirror second volume provides a mirror copy of the second volume.

20. The method of claim 18, further comprising:
migrating a third volume in the second selected volume group to a fourth volume in the first selected volume group;
copying updates to the third volume, received while migrating the third volume to the fourth volume, to a mirror second volume at the secondary site; and
copying data at the fourth volume to a mirror third volume at the secondary site while the third volume is being migrated to the fourth volume.

21. The method of claim 18, wherein the usage rates indicate Input/Output (I/O) activity to each of the volumes in the volume groups, wherein the selected first volume group has a highest I/O activity of the volume groups and wherein the selected second volume group has a lowest I/O activity of the volume groups.

22. The method of claim 21, further comprising:
determining whether a difference of the I/O activity for the volume groups having the highest I/O activity and the lowest I/O activity exceeds a specified deviation amount, wherein the selecting the first and the second selected volume groups, migrating the first volume, and copying the updates to the first volume are performed in response to determining that the difference of the I/O activity for the volume groups exceeds the specified deviation amount.

23. The method of claim 22, wherein the first volume has a highest I/O activity of volumes in the first selected volume group.

* * * * *